United States Patent [19]

Delzer et al.

[11] Patent Number: 4,902,660
[45] Date of Patent: Feb. 20, 1990

[54] CATALYST FOR OXIDATION OF CARBON MONOXIDE

[75] Inventors: Gary A. Delzer, Bartlesville; John H. Kolts, Ochelata, both of Okla.

[73] Assignee: Phillips Petroleum Company, Bartlesville, Okla.

[21] Appl. No.: 303,888

[22] Filed: Jan. 30, 1989

Related U.S. Application Data

[62] Division of Ser. No. 160,721, Feb. 26, 1988.

[51] Int. Cl.$^4$ .................. B01J 21/04; B01J 21/10; B01J 23/89; B01J 27/20
[52] U.S. Cl. .................... 502/174; 502/327; 502/339
[58] Field of Search ............... 502/174, 327, 339

[56] References Cited

U.S. PATENT DOCUMENTS

| | | | |
|---|---|---|---|
| 1,995,274 | 5/1935 | Eversole | 423/437 |
| 3,170,758 | 2/1965 | Honerkamp | 423/437 |
| 3,594,982 | 4/1970 | Pearson | 502/174 |
| 3,914,377 | 10/1975 | Anderson et al. | 423/247 |
| 4,117,082 | 9/1978 | Matsuyama | 423/247 |
| 4,123,391 | 10/1978 | Noguchi et al. | 252/466 PT |
| 4,212,854 | 7/1980 | Maki et al. | 423/247 |
| 4,239,656 | 12/1980 | Fujitani et al. | 252/462 |
| 4,284,762 | 8/1981 | Miyata et al. | 528/485 |
| 4,347,353 | 8/1982 | Miyata et al. | 528/485 |
| 4,431,750 | 2/1984 | McGinnis et al. | 502/329 |
| 4,476,324 | 10/1984 | Reichle | 502/174 |
| 4,490,482 | 12/1984 | Mathieu | 502/339 |
| 4,639,432 | 1/1987 | Holt et al. | 502/331 |
| 4,675,307 | 6/1987 | Tomiguchi et al. | 502/341 |

FOREIGN PATENT DOCUMENTS

| | | | |
|---|---|---|---|
| 0116785 | 8/1984 | European Pat. Off. | |
| 0278535 | 8/1988 | European Pat. Off. | |
| 54-56089 | 5/1979 | Japan | 502/174 |
| 60-257837 | 12/1985 | Japan | |
| 1116585 | 6/1968 | United Kingdom | |
| 2028571 | 5/1980 | United Kingdom | |
| 2083687 | 3/1982 | United Kingdom | |

Primary Examiner—W. J. Shine
Attorney, Agent, or Firm—K. K. Brandes

[57] ABSTRACT

A composition of matter comprising hydrotalcite Pt and Fe has been prepared by a process comprising the steps of impregnating hydrotalcite with Pt and Fe, followed by calcining and treatment with a reducing gas. The above composition of matter is used as catalyst in a process for oxidizing CO to $CO_2$, e.g., in a $CO_2$ laser. A process for preparing a composition of matter comprises the step of impregnating hydrotalcite with Pt and/or Pd at a pH of at least about 5.

35 Claims, No Drawings

CATALYST FOR OXIDATION OF CARBON MONOXIDE

This application is a division of application Ser. No. 160,721, filed Feb. 26, 1988, now allowed.

BACKGROUND OF THE INVENTION

This invention relates to the oxidation of carbon monoxide to carbon dioxide. In another aspect, this invention relates to the catalytic oxidation of carbon monoxide, in particular under conditions suitable for laser applications. In a further aspect, this invention relates to an effective CO oxidation catalyst composition. In still another aspect, this invention relates to a process for preparing a CO oxidation catalyst composition.

The use of catalysts for the oxidation of carbon monoxide to carbon dioxide by reaction with oxygen, in particular at low temperature, is of much interest, e.g., in breathing masks designed to remove CO from inhaled air, and in $CO_2$ lasers for combining CO and $O_2$ formed by dissociation of $CO_2$ during discharge. In the latter application, the presence of $O_2$ is most undesirable because is can cause a breakdown of the electrical field in the laser cavity. Several patents, such as U.S. Pat. Nos. 4,490,482 and 4,639,432, disclose compositions useful as CO oxidation catalysts in $CO_2$ laser applications. However, there is an ever present need to develop new, effective CO oxidation catalyst compositions and/or improved processes for preparing effective CO oxidation catalyst compositions.

SUMMARY OF THE INVENTION

It is an object of this invention to provide a composition of matter which is effective as a catalyst for the oxidation of carbon monoxide with free oxygen. It is another object of this invention to provide a process for preparing a composition of matter which is effective as a catalyst for the oxidation of carbon monoxide. It is a further object of this invention to provide an effective process for catalytically oxidizing carbon monoxide. Other objects and advantages will be apparent from the detailed description and the claims.

In accordance with this invention, a process for preparing a composition of matter, which is useful and effective as a catalyst composition for the oxidation of carbon monoxide (CO) by reaction with free oxygen ($O_2$), comprises the steps of:

(a) contacting (preferably impregnating) a support material comprising (preferably consisting essentially of) hydrotalcite with a solution having a pH of at least about 5 (preferably about 6–8) and comprising at least one dissolved compound of at least one noble metal selected from the group consisting of platinum or palladium (preferably Pt); and (b) heating the material obtained in step (a) under such conditions as to substantially dry said material obtained in step (a) and to at least partially (preferably substantially) convert said at least one compound of Pt and/or Pd to at least one substrate selected from the group consisting of oxides of Pt, oxides of Pd, Pt metal and Pd metal.

Preferably, the preparation process comprises the additional step of:

(c) heating the material obtained in step (b) in a reducing gas atmosphere, preferably a free hydrogen containing gas or a carbon monoxide containing gas, more preferably a stream of hydrogen gas (substantially pure $H_2$), under such conditions as to activate said material obtained in step (b), i.e., to make the material obtained in step (b) more active as a catalyst for CO oxidation by reaction with $O_2$.

In a preferred embodiment, heating step (c) is carried out at a temperature in the range of from about 50° to about 450° C. In a further preferred embodiment, the solution used in step (a) additionally comprises at least one dissolved compound of iron, which is at least partially (preferably substantially) converted to iron oxide in step (b).

Also in accordance with this invention, there is provided a composition of matter (useful and effective as a catalyst composition for the oxidation of CO with $O_2$) comprising (i) a support material comprising (preferably consisting essentially of) hydrotalcite and (ii) at least one noble metal selected from the group consisting of Pt and Pd; said composition of matter having been prepared by the process described above comprising steps (a) and (b), and preferably also (c). Preferably, said composition of matter further comprises (iii) iron oxide. In a more preferred embodiment, the composition of matter consists essentially of components (i), (ii) and (iii).

Further in accordance with this invention, a process for oxidizing carbon monoxide comprises contacting a gas mixture comprising CO and $O_2$ with a catalyst composition comprising components (i) and (ii), as defined above, said catalyst composition having been prepared by a process comprising steps (a), (b) and (c), as defined above; under such contacting conditions as to at least partially (preferably substantially) convert CO and $O_2$ to $CO_2$.

Preferably, in the CO oxidation process of this invention, the catalyst composition of this invention (described above) additionally comprises at least one iron compound (preferably, FeO and/or $Fe_2O_3$ and/or $Fe_3O_4$). In a preferred embodiment, the CO oxidation process of this invention is carried out at a temperature in the range of about 0°0 to about 100° C.

DETAILED DESCRIPTION OF THE INVENTION

Any hydrotalcite containing material can be used as the support material. The hydrotalcite can be naturally occurring or synthetic hydrotalcite or a synthetic hydrotalcite-like compound or mixtures thereof. Presently preferred are the hydrotalcite materials described in U.S. Pat. Nos. 4,347,353 and 4,284,762; the disclosures of which are herein incorporated by reference. These hydrotalcite materials are commercially available (see Example I). The presently preferred hydrotalcite has the chemical formula of $Mg_{4.5}Al_2(OH)_{13}CO_3 \cdot 3.5\ H_2O$.

The impregnation of the support material with Pt and/or Pd (preferably Pt) can be carried out in any suitable manner. First, compounds of Pt and/or Pd are dissolved in a suitable solvent (preferably water) so as to prepare solutions of suitable concentration, generally containing from about 0.002 to about 0.20, preferably about 0.005 to about 0.05, g Pt and/or Pd per cc of solution. Non-limiting examples of suitable compounds of Pt and Pd are: $PtCl_2$, $PtCl_4$, $PtBr_4$, $Pt(NH_3)_4Cl_2$, $Pt(NH_3)_4(NO_3)_2$ and the like; $PdCl_2$, $PdCl_4$, $Pd(NH_3)_4(NO_3)_2$ and the like; preferably (at present) $Pt(NH_3)_4(NO_3)_2$. The solution must have a pH of at least about 5 (i.e., about 5 or higher), preferably about 6–8, so as to avoid damage to the structure of hydrotalcite. The support material is then impregnated by soaking it in the solution of Pt and/or Pd compounds; or (less preferably) the Pt and/or Pd containing solution is sprayed onto the support material. The ratio of Pt and/or Pd solution to support material generally is such that the final catalyst contains about 0.5 to about 5, preferably about 1 to about 3, weight-% Pt or Pd, more preferably Pt. When a solution contains both Pt and Pd compounds, the level of Pt and Pd generally is about 0.5 to about 5, preferably about 1 to about 3, weight percent (Pt+Pd).

In a preferred embodiment, a compound of iron is also present in the impregnating solution (besides Pt and/or Pd). Non-limiting examples of suitable Fe compunds that can be used as solutes are Fe carboxylates, $Fe(NO_3)_2$, $Fe(NO_3)_2$, Fe(II) acetylacetonate (presently preferred), and the like. Generally, the concentration of Fe (expressed as Fe metal) is in the range of from about 0.001 to about 0.2, preferably about 0.002 to about 0.05, g Fe per cc solution (preferably aqueous or alcoholic). The impregnation of the support material with Pt and/or Pd and Fe can be carried out either by sequential impregnation (first Pt and/or Pd, then Fe) or by simultaneous impregnation in step (a) (using a solution containing Pt and/or Pd compounds and at least one Fe compound).

When sequential impregnation is employed, the impregnation with a solution of at least one Fe compound is carried out after heating step (b) and before step (c). Thus, after step (b) an impregnating step (a*) with at least one dissolved Fe compound follows and a subsequent heating step (b*) is carried out in substantially the same manner as step (b). If preferred step (c) is also performed, step (c) is carried out with the product obtained in step (b*). The ratio of Fe containing solution to support material is such as to provide a level of about 0.1 to about 4, preferably about 0.2-2, weight percent Fe.

Heating step (b) is generally carried out in an inert or oxidizing atmosphere, preferably a free oxygen containing gas atmosphere (such as air), generally at a temperature ranging from about 200° to about 400° C. for about 0.5-5 hours.

Reducing step (c) can be carried out in any suitable manner, preferably at a temperature in the range of from about 50° to about 450° C., more preferably from about 100° to about 300° C. Any reducing gas can be employed, such as a gas comprising $H_2$, CO, gaseous hydrocarbons such as methane, mixtures of the above, and the like. Preferably, a free hydrogen containing gas or a carbon monoxide containing gas, more preferably a hydrogen gas stream (substantially pure), is employed. Reducing step (c) can be carried out for any suitable period of time suitable to activate the calcined material obtained in step (b), or, if applicable, step (b*), preferably from about 0.5 to about 10 hours, more preferably about 1-4 hours.

The process for oxidizing a carbon monoxide containing feed gas can be carried out at any suitable temperature and pressure conditions, for any suitable length of time, at any suitable gas hourly space velocity, and any suitable volume ratio of CO and $O_2$. The reaction temperature generally is in the range of from about −60° to about 400° C., preferably from about 0° to about 100° C., more preferably from about 20° to about 50° C. The pressure during the oxidation process generally is in the range of from about 1 to about 2,000 psia, preferably from about 5 to about 40 psia. The volume ratio of CO to $O_2$ is the feed gas can range from about 1:100 to about 100:1, and preferably is in the range of from about 1:10 to about 10:1. The volume percentage of CO and the volume percentage of $O_2$ in the feed gas can each be in the range of from about 0.05 to about 50, preferably from about 0.05 to about 3. The gas hourly space velocity (cc feed gas per cc catalyst per hour) can be in the range of from about 0.5 to about 10,000, preferably from about 1 to about 1,000. It is understood that the calculation of the gas hourly space velocity is based on the volume of the active catalyst i.e., the hydrotalcite-supported Pt and/or Pd catalyst (optionally also containing iron oxide), excluding the volume occupied by any additional inert support material, such as a monolith, which may be present.

The feed gas can be formed in any suitable manner, e.g., by mixing CO, $O_2$ and, optionally, other gases such as $CO_2$, $N_2$, He and the like, such as in a carbon dioxide laser cavity. Or the feed gas can be an exhaust gas from a combustion engine, or it can be air that is to be inhaled by humans and contains undesirably high levels of toxic carbon monoxide, and the like. The feed gas can be contacted in any suitable vessel or apparatus, such as in a laser cavity or in an exhaust pipe of a combustion engine, or in a gas mask (used by humans), wherein the feed gas passes over the catalyst composition of this invention at the conditions described above. The CO oxidation process of this invention can be carried out in any suitable setting and for any purpose, e.g., to recombine CO and $O_2$ and $CO_2$ lasers, to oxidize CO contained in exhaust gases or in air, to make isotopically labeled $CO_2$ from CO and the $^{18}O$ isotope, and the like.

The following examples are presented in further illustration of the invention and are not to be construed as unduly limiting the scope of the invention.

EXAMPLE I

This example illustrates the preparation of hydrotalcite-supported catalysts.

The hydrotalcite support material (also referred to as hydrotalcite-like compound) used as support was manufactured by Kyowa Chemical Industry Company, Ltd., Osaka, Japan, and was marketed by Mitsui and Company (U.S.A.), Inc., Houston, Tex. under the product designation DHT-4A. DHT-4A hydrotalcite was a basic aluminum hydroxide carbonate hydrate having the chemical formula of $Mg_{4.5}Al_2(OH)_{13}CO_3 \cdot 3.5\ H_2O$, a surface area (measured by $N_2$ adsorption in accordance with the BET method) of $10\pm5$ m$^2$/g, a density of 2.1 g/cc, and a Mohs hardness of 2-2.5. The hydrotalcite had a layered crystal structure with the following layer sequence: $OH^-$, ($Mg^{2+}$,$Al^{3+}$), $OH^-$,$CO_3{}^{2-}$, $H_2O$), wherein the distance between two successive $Mg^{2+}$ layers was 7.63 angstroms and the distance between two successive $OH^-$ layer, located above and below a ($Mg^{2+}$, $Al^{+3}$) layer, was 4.77 angstroms. The material lost about 0.3 weight-% when dried at 105° C. for 3 hours, and was a white powder (95.7% of which had a particle size of less than 1 micrometer).

Catalyst A was prepared by mixing 10 grams of DHT-4A hydrotalcite, which had been calcined in air at about 400° C. for about 5 hours, with about 15 cc of an aqueous solution of $Pd(NH_3)_4(NO_3)_2$, having a pH of about 7 and containing 0.010 g Pt per cc solution. The thus-impregnated material was dried and calcined in air at 300° C. for 3 hours. The calcined material was ground to a powder and impregnated twice by mixing with 0.23 grams of Fe(II) acetylacetonate (formula weight: 254), dissolved in 30 cc methanol. The mixture was dried and calcined in air at 400° C. for 3 hours. The Pt/Fe-impregnated hydrotalcite was allowed to cool in a desiccator, ground to a powder, mixed with enough water to make a thick paste, dried, and sieved. A 10–20 mesh fraction was heated in air at 400° C. for 2 hours, and then reduced in a stream of substantially pure hydrogen gas at about 200° C. for about 2 hours. Catalyst A contained 1.5 weight-% Pt and 0.5 weight-% Fe.

Catalyst B was prepared by mixing 10 grams of calcined DHT-4A hydrotalcite with 15 cc of an aqueous solution of $H_2PtCl_6$ having a Ph of about 2 and containing 0.010 g Pt per cc solution. The thus-impregnated material was dried and calcined in air at 300° C. for 3 hours, ground to a powder, and impregnated with 10 cc of an aqueous solution of $Fe(NO_3)_3$ containing 0.005 g Fe per cc solution. The Pt/Fe-impregnated hydrotalcite was calcined, cooled, ground, wetted with water, dried, sieved, calcined and reduced in accordance with the procedure for Catalyst A. Catalyst B also contained 1.5 weight-% Pt and 0.5 weight-% Fe.

EXAMPLE II

The example illustrates tests for determining activity of the Pt/Fe-promoted hydrotalcite catalysts for catalyzing the oxidation of carbon monoxide at low temperature (to simulate catalytic recombination of CO and $O_2$ in $CO_2$ lasers).

A gaseous feed blend comprising CO, $O_2$, He and $N_2$ was passed through a flow meter, a needle valve and a glass reactor tube in an upflow direction. The glass reactor tube had an inner diameter of about 0.7 cm and generally contained a bed of about 0.5 cc (1 g) catalyst to be tested. The temperature in the catalyst bed was measured by means of a thermocouple inserted into the top of the catalyst bed. The content of CO in the gaseous effluent from the reactor was determined by means of a Beckman Model 864 CO infrared analyzer, and CO conversion was determined from these IR analyzer data.

All tests were carried out at about 26° C. and atmospheric pressure conditions. The feed rate of the gaseous feed stream was about 30 cc/minute. The gas feed contained 1.2 volume-% CO, 0.6 volume-% $O_2$, 48.6 volume-% $N_2$ and 49.7 volume-% He. Test results are summarized in Table I.

TABLE I

| Catalyst | Run Time (Hours) | %-Conversion of CO | Conversion of CO in cc/minute |
|---|---|---|---|
| A | 2 | 65.8 | 0.23 |
|   | 4 | 55.6 | 0.20 |
|   | 6 | 48.7 | 0.17 |
|   | 8 | 43.6 | 0.15 |
|   | 10 | 40.2 | 0.14 |
|   | 12 | 37.6 | 0.13 |
|   | 14 | 35.9 | 0.13 |
|   | 16 | 34.2 | 0.12 |
| B | 1–2 | 0 | 0 |

Test data in Table I show that the Pt/Fe/hydrotalcite catalyst, prepared by impregnation with neutral $Pd(NH_3)_4(NO_3)_2$ (i.e., Catalyst A), was quite active as a CO oxidation catalyst, whereas Catalyst B, prepared by impregnation with acidic $H_2PtCl_6$, was inactive as a CO oxidation catalyst.

Additional tests showed that hydrotalcite was damaged by aqueous solutions having a pH of 2–4 and was gradually dissolved in these solutions. On the other hand, no dissolution of hydrotalcite occured in a neutral aqueous solution (pH: 7). Based on these test results and the data shown in Table I, it is concluded that the impregnating solutions containing Pt and/or Fe compounds must have a pH of at least about 5, i.e., about 5 or higher, preferably about 6–8.

Reasonable variations, modifications and adaptations for various usages and conditions can be made within the scope of the disclosure and the appended claims, without departing from the scope of this invention.

That which is claimed is:

1. A composition of matter, which is active as a catalyst for the oxidation of carbon monoxide, comprising hydrotalcite as support material, platinum metal and iron oxide.

2. A composition of matter in accordance with claim 1, wherein said support material is a hydrotalcite having the chemical formula of $Mg_{4.5}Al_2(OH)_{13}CO_3.3.5\ H_2O$.

3. A composition of matter in accordance with claim 1, wherein said catalyst composition contains about 0.5 to about 5 weight percent Pt and about 0.1 to about 4 weight percent Fe.

4. A composition of matter in accordance with claim 1, wherein said catalyst composition contains about 1 to about 3 weight percent Pt and about 0.2 to 2 weight percent Fe.

5. A composition of matter in accordance with claim 1 consisting essentially of hydrotalcite as support material, platinum metal and iron oxide.

6. A composition of matter in accordance with claim 1 having been prepared by a process comprising the steps of
(a) contacting a support material comprising hydrotalcite with a solution having a pH of at least about 5 and comprising at least one dissolved platinum compound and at least one dissolved iron compound;
(b) heating the material obtained in step (a) under such conditions as to substantially dry said material obtained in step (a) and to at least partially convert said at least one platinum compound to at least one substance selected from the group consisting of platinum oxides and platinum metal, and to at least partially convert said at least one iron compound to iron oxide; and
(c) heating the material obtained in step (b) in a reducing gas atmosphere, under such conditions as to form said composition of matter.

7. A composition of matter in accordance with claim 6, wherein said conditions in step (c) comprise a temperature in the range of from about 50° C. to about 450° C.

8. A composition of matter in accordance with claim 6, wherein said reducing gas atmosphere is selected from the group consisting of a free hydrogen containing gas and a carbon monoxide containing gas.

9. A composition of matter in accordance with claim 6, wherein step (c) is carred out in a stream of hydrogen gas at a temperature in the range of from about 100° to about 300° C., for a period of time in the range of from about 0.5 to 10 hours.

10. A composition of matter in accordance with claim 6, wherein said support material is a hydrotalcite having the chemical formula $Mg_{4.5}Al_2(OH)_{13}CO_3.3.5\ H_2O$.

11. A composition of matter in accordance with claim 6, wherein heating step (b) is carried out at a temperature of about 200°–400° C.

12. A composition of matter in accordance with claim 6, wherein said heating step (b) is carried out in a free oxygen containing gas atmosphere.

13. A composition of matter in accordance with claim 6, wherein the pH of said solution used in step (a) has a pH of about 6–8.

14. A composition of matter in accordance with claim 6, wherein said at least one platinum compound is $Pt(NH_3)_4(NO_3)_2$ and said at least one iron compound is Fe(II) acetylacetonate.

15. A composition of matter in accordance with claim 1 having been prepared by a process comprising the steps of
  (a) contacting a support material comprising hydrotalcite with a solution having a pH of at least about 5 and comprising at least one dissolved platinum compound;
  (b) heating the material obtained in step (a) under such conditions as to substantially dry said material obtained in step (a) and to at least partially convert said at least one platinum compound to at least one substrate selected from the group consisting of platinum oxides and platinum metal;
  (a*) impregnating the material obtained in step (b) with a solution comprising at least one dissolved iron compound;
  (b*) heating the material obtained in step (a*) under such conditions as to substantially dry said material obtained in step (a*) and to at least partially convert said at least one iron compound to iron oxide; and
  (c) heating the material obtained in step (b*) in a reducing gas atmosphere, under such conditions as to form said composition of matter.

16. A composition of matter in accordance with claim 15, wherein said conditions in step (c) comprise a temperature in the range of from about 50° to about 450° C.

17. A composition of matter in accordance with claim 15, wherein said reducing gas atmosphere is selected from the group consisting of a free hydrogen containing gas and a carbon monoxide containing gas.

18. A composition of matter in accordance with claim 15, wherein step (c) is carried out in a steam of hydrogen gas at a temperature in the range of from about 100° to about 300° C., for a period of time in the range of from about 0.5 to about 10 hours.

19. A composition of matter in accordance with claim 15, wherein said support material is a hydrotalcite having the chemical formula $Mg_{4.5}Al_2(OH)_{13}CO_3.3.5\ H_2O$.

20. A composition of matter in accordance with claim 15, wherein steps (b) and (b*) are carried out at a temperature of about 200°–400° C.

21. A composition of matter in accordance with claim 15, wherein heating steps (b) and (b*) are carried out in a free oxygen containing gas atmosphere.

22. A composition of matter in accordance with claim 15, wherein the pH of said solution used in step (a) has a pH in the range of from about 6–8.

23. A composition of matter in accordance with claim 15, wherein said at least one platinum compound is $Pt(NH_3)_4(NO_3)_2$ and said at least one iron compound is Fe(II) acetylacetonate.

24. A process comprising the steps of
  (a) contacting a support material comprising hydrotalcite with a solution having a pH of at least about 5 and comprising at least one dissolved compound of at least one noble metal selected from the group consisting of platinum and palladium; and
  (b) heating the material obtained in step (a) under such conditions as to substantially dry said material in step (a) and to at least partially convert said at least one compound of at least one noble metal to at least one substance selected from the group consisting of oxides of Pt, oxides of Pd, Pt metal and Pd metal.

25. A process in accordance with claim 24 comprising the additional step of
  (c) heating the material obtained in step (b) in a reducing gas atmosphere at a temperature in the range of from about 50° to about 450° C. for about 0.5 to about 10 hours.

26. A process in accordance with claim 25, wherein said reducing gas atmosphere is selected from the group consisting of a free hydrogen containing gas and a carbon monoxide containing gas.

27. A process in accordance with claim 25, wherein step (c) is carried out in a stream of hydrogen gas at a temperature in the range of from about 100° to about 300° C.

28. A process in accordance with claim 24, wherein said support material is a hydrotalcite having the formula $Mg_{4.5}Al_2(OH)_{13}CO_3.3.5\ H_2O$, and said noble metal is platinum.

29. A process in accordance with claim 24, wherein heating step (b) is carried out at a temperature of about 200°–400° C.

30. A process in accordance with claim 24, wherein said heating step (b) is carried out in a free oxygen containing gas atmosphere.

31. A process in accordance with claim 24, wherein said solution used in step (a) is aqueous and has a pH of about 6–8.

32. A process in accordance with claim 24, wherein said solution used in step (a) further comprises at least one iron compound, and said at least one iron compound is at least partially converted to iron oxide in step (b).

33. A process in accordance with claim 32, wherein the material obtained in step (b) is subsequently heated in a reducing gas atmosphere at a temperature in the range of from about 50° to about 450° C. for about 0.5 to about 10 hours.

34. A process in accordance with claim 24, wherein said process further comprises the steps of
  (a*) impregnating the material obtained in step (b) with a solution comprising at least one iron compound, and
  (b*) heating the material obtained in step (a*) under such conditions as to substantially dry said material obtained in step (a*) and to at least partially convert said at least one iron compound to iron oxide.

35. A process in accordance with claim 34 wherein the material obtained in step (b*) is subsequently heated in a reducing gas atmosphere at a temperature in the range of from about 50° to about 450° C. for about 0.5 to about 10 hours.

* * * * *